United States Patent [19]

Ophir et al.

[11] 3,922,877
[45] Dec. 2, 1975

[54] AIR CONDITIONING SYSTEM FOR AUTOMOTIVE VEHICLES

[76] Inventors: Abraham Ophir, 34, Neve Oved St., Herzlia Pituah; Joseph Weinberg, 29 Brodetsky St., Tel Aviv, both of Israel

[22] Filed: July 22, 1974

[21] Appl. No.: 490,693

[30] Foreign Application Priority Data
Oct. 3, 1972  Israel.................................... 40492

[52] U.S. Cl. ..................... 62/238; 62/239; 62/323; 62/500
[51] Int. Cl.² ......................................... F25B 27/02
[58] Field of Search ............. 62/238, 500, 191, 239, 62/323

[56] References Cited
UNITED STATES PATENTS

| 1,871,244 | 8/1932 | Steuart................................. 62/238 |
| 2,327,451 | 8/1943 | Perrine ................................ 62/238 |
| 3,153,441 | 10/1964 | Pippert ............................... 62/238 |
| 3,500,897 | 3/1970 | Von Cube........................... 62/238 |

*Primary Examiner*—William J. Wye
*Attorney, Agent, or Firm*—Toren, McGeady and Stanger

[57] ABSTRACT

An air conditioning unit for motor cars is characterised thereby that the waste heat of the engine of the car is utilised for powering said air conditioning system, in combination with a liquid pump, thus avoiding a significant additional load on the engine of the car.

2 Claims, 4 Drawing Figures

1

AIR CONDITIONING SYSTEM FOR AUTOMOTIVE VEHICLES

BACKGROUND OF THE INVENTION

Conventional air conditioning systems for motor cars are powered by the engine of the car, thus imposing a substantial additional load on the engine, especially during its acceleration. Thus, conventional air conditioning units of motor cars reduce the available power of the engine, and this especially during critical periods of time. Due to this, conventional air conditioning units are generally installed only in motor cars above a certain engine volume; and hardly any such units exist for small cars of the 1,000 to 1,500 cc engines of European manufacture.

The conventional air conditioning system for automotive vehicles includes a compressor driven by the engine motor for compressing the refrigerant gas before the latter is condensed in the condenser. The power required for driving the compressor places a substantial power drain on the automotive engine, which reduces car performance and also increases fuel consumption. In addition, only relatively large automobiles have sufficient spare power to drive the compressors of air conditioning systems.

SUMMARY OF THE INVENTION

The present invention relates to an air conditioning system for automobile vehicles in which the waste heat from the vehicle engine is utilised for powering the air conditioning system, whereby no significant mechanical loss is imposed on the vehicle engine by such system. This application is a continuation in part of our copending application Ser. No. 401,550, filed Sept. 9, 1973, now abandoned.

More particularly, the invention provides an air conditioning system for automobile vehicles, comprising a closed refrigerant fluid system including a condenser in which the refrigerant is liquefied and an evaporator in which the refrigerant is vaporised, the evaporator being exposed to the automobile cabin for cooling same, characterised in that the closed system further includes a generator through which the refrigerant gas passes, said generator having a connection from the automobile engine exhaust system for heating the refrigerant gas, passing through the generator, by the waste heat from the engine, thereby raising the temperature and pressure of the refrigerant and evaporating same before it is condensed in the condenser.

It will be seen that the novel air conditioning system of the present invention operates on the caloric energy developed by the automotive engine which is otherwise wasted by being passed out through the engine exhaust system.

A system constructed in accordance with the invention is described below, one including an ejector cycle.

Further features and advantages of the invention will become apparent from the description below.

The invention is herein described, somewhat diagrammatically and by way of example only, with reference to the accompanying drawings.

DESCRIPTION OF THE PREFERRED EMBODIMENT

Figure 1:
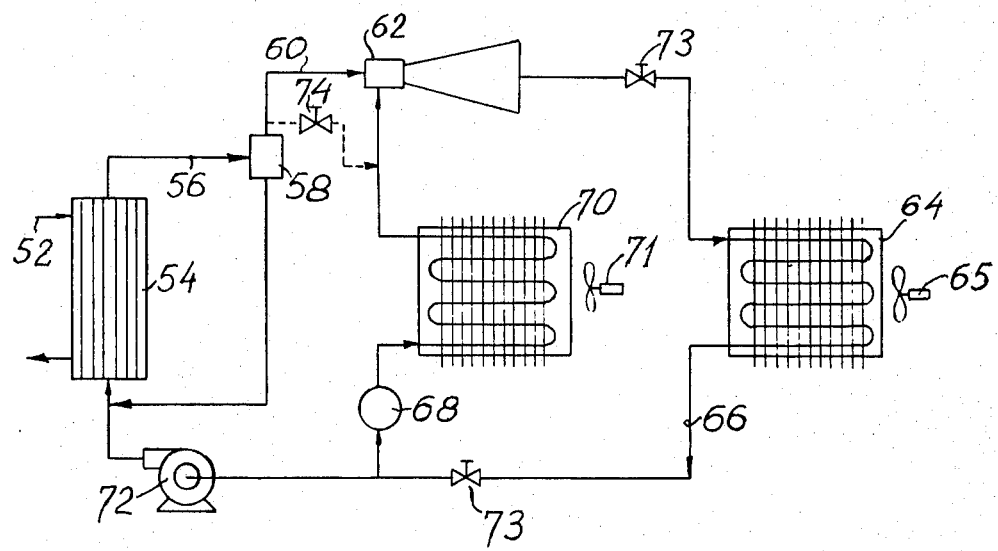
FIG. 1 illustrates one type of automotive air conditioning system constructed in accordance with the invention and based on an ejector cycle.

Referring first to FIG. 1 which illustrates the process flow of the automotive air conditioning system: waste heat (from the exhaust gases) is passed via ducts 52 to a generator 54 in which the refrigerant is Freon (e.g. Freon 11, 21, 113 or 114). The refrigerant is thus heated and vaporised in generator 54, the gas being then passed via duct 56 to a droplets separator 58. The gas is led by duct 60 to the high pressure inlet of an ejector 62, and from there to a condenser 64. The latter is of the finned type, air-cooled by forced air induced by the vehicle's radiator fan 65. The liquefied gas leaves condensor 64 through duct 66 and is split into two parts. One part is passed through an expansion valve 68 and then to evaporator 70 to the low pressure side of ejector 62, evaporator 70 being also of the finned type including a forced air cooling fan 71 for cooling the automobile cabin, the pump 72 back to the bottom of generator 54 thus completing the cycle.

The ejector cycle is especially suited for small cars, such as passenger cars as the elements needed are quite small and compact. These can easily be fitted into the generally quite crowded environment of the car engine, as is set out in detail in this specification.

The above described system can also be used for the further purpose of heater, for the heating of the interior of the car during weather periods when heating is required. This is done by the addition of the valves 73 and 74 and by the conduit lines of the refrigerant shown in broken lines in the FIG. 1. When the device is used as air conditioning unit, the valve 73 is open and valve 74 is closed. When the system is to be used as heating unit, for heating the interior of the car, valve 73 is closed and valve 74 is opened. By thus diverting the flow of the refrigerant, the evaporator 70 in FIG. 1 acts as a condensor and the cabin of the car is heated. The ejector 62 and condensor 64 are not in use. It is clear that the direction of flow is thus reversed.

This modification eliminates the need to provide a special heater unit for the car, as is generally required with normal compressor type air conditioning units. With such conventional air conditioning units an additional heater is generally provided which operates on the waste heat of the engine (water used for cooling or exhaust gases). This is done in order to avoid during the cold season the need of using the air conditioner which consumes an appreciable part of the power of the engine and increases petrol consumption.

Figure 2:
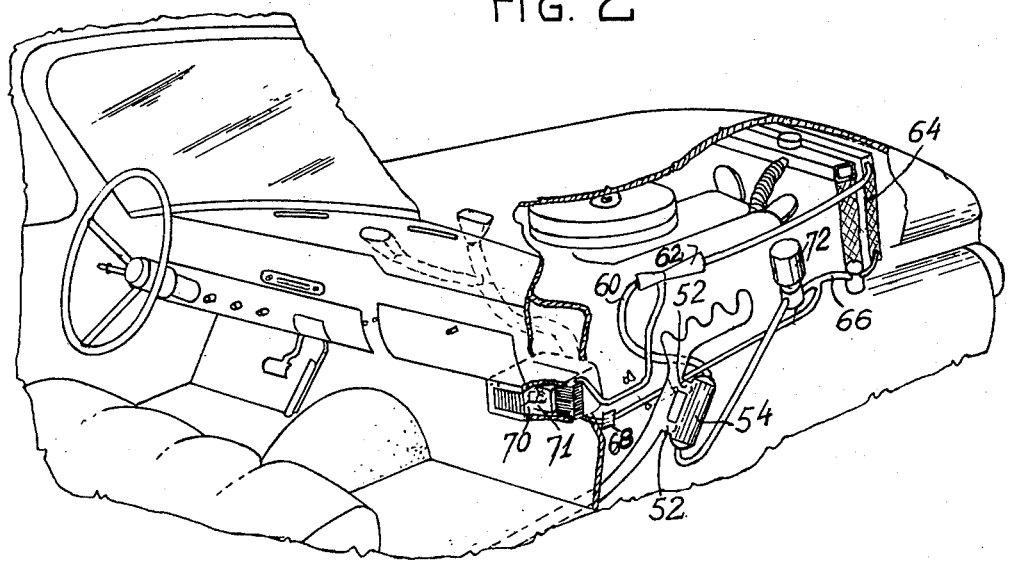
FIG. 2 is a perspective, fractional view of a motor car in which the new system is provided.
Figure 3:
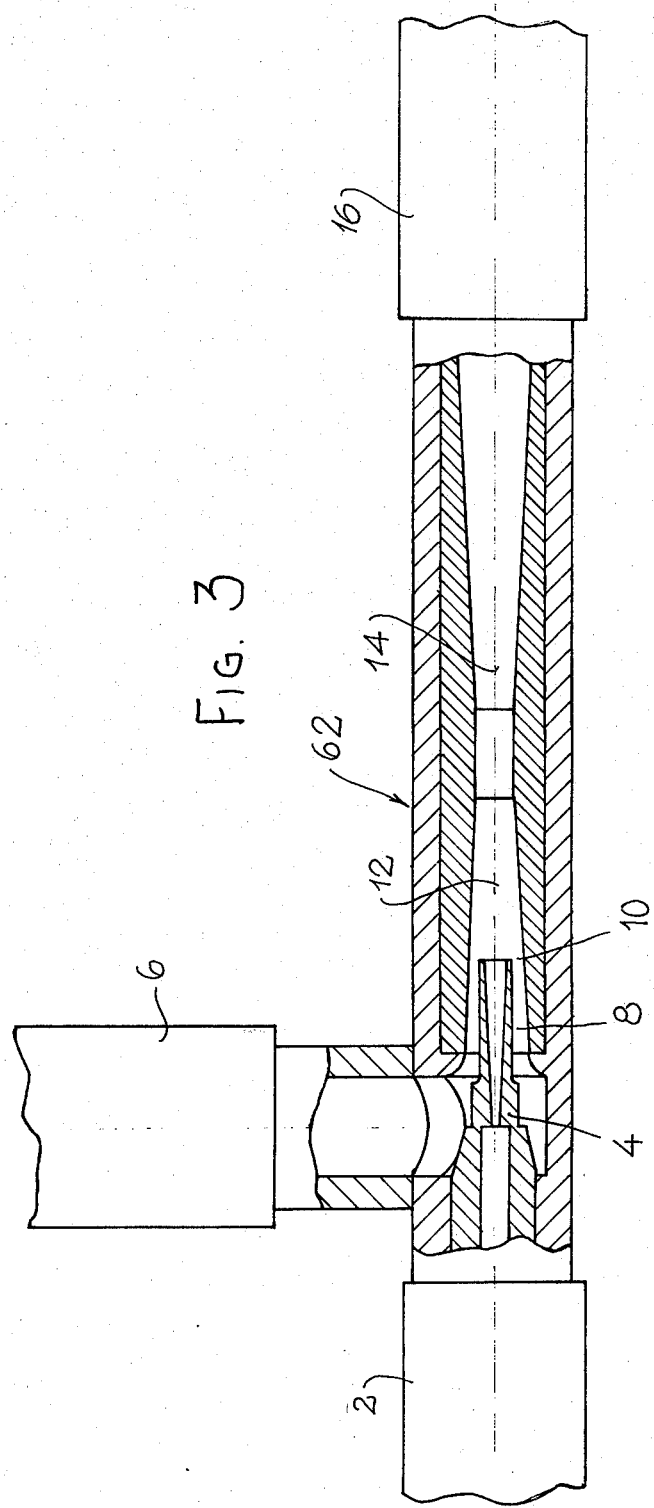
FIG. 3 is an axial section, illustrating the structure and special features of the ejector.
Figure 4:
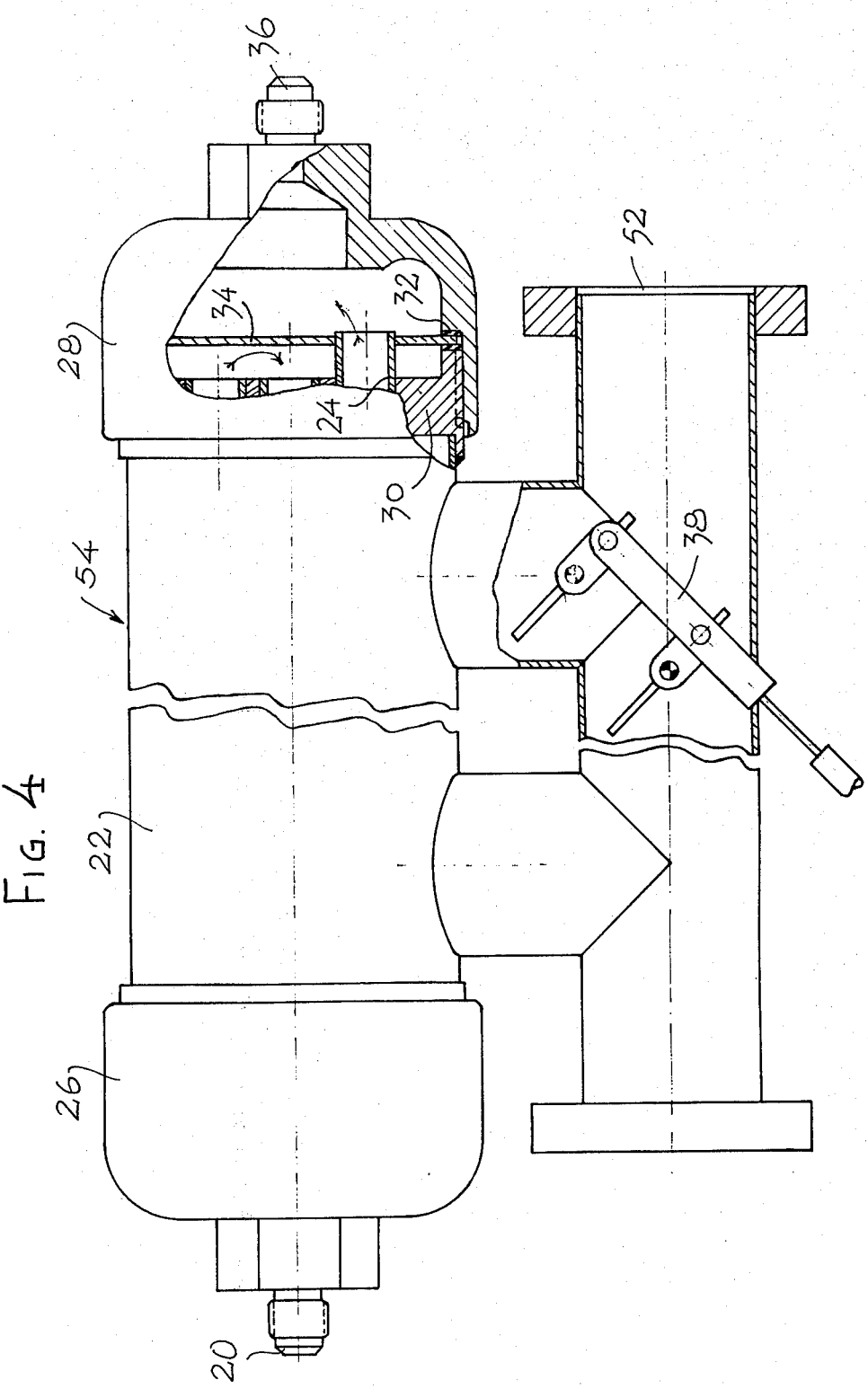
FIG. 4 shows in partial section the preferred construction of a high pressure gas generator.

FIG. 2 shows how the constituent parts of the system can be accommodated in the vicinity of the engine of the car. The respective parts are indicated by the numerals appearing in the above description, thus a further detailed description of this figure does not seem to be necessary. A further detailed description will be given in connection with FIGS. 3 and 4, showing the ejector and the generator.

Before describing, however, these elements, an example of a system constructed in accordance with the invention is here given:

Condensing temp. = 122°F
Evaporating temp. = 60°F

The refrigerant is Freon F11.

Referring to Ashrae Guide and Data Book 1963, Fundamentals and Equipment pg. 294 and designing for generator temp. of 320°F., the enthalpies in the cycle are:

| | |
|---|---|
| In the generator | 126 Btu/lb |
| in the outlet from the delaval nozzle of the ejector | 96 Btu/lb |
| in the mixing zone of the ejector | 97.5 Btu/lb |
| in the condensor | 107.5 Btu/lb |

Taking into account the different efficiency coefficients in the ejector parts, the ratio of the actuated stream flow rate to the actuating stream is:

$0.8 \sqrt{(126-96)/(107.5-97.5)} - 1 = 38.56$ percent

On the base load of 1 ton refrigeration in the evaporator, the size of the generator is $1/0.3856 = 2.6$ ton refrigeration, and the condensor is therefore $1 + 2.6 = 3.6$ ton refrigeration.

The other parameters are calculated similarly to these results.

It will thus be seen that the ejector cycle system described and illustrated can be used to provide sufficient energy for powering the air conditioning unit substantially, solely from the waste heat of the vehicle engine, whereby no significant mechanical load is imposed on the vehicle engine.

In order to illustrate the compact dimensions of a system according to the present invention, the dimensions of a prototype built are given hereinbelow:

As refrigerant Freon 114 was selected, the generator heated by the exhaust gases was of the shell and tube type, external dimensions diameter 3 inch, length 420 mm; heat transfer area: 2.7 sq./ft. thermal load 32800 BTU/hour. At the exit the temperature of the Freon was 300°F and the pressure 400 psi. The ejector had the following dimensions; diameter 1 inch, length 9 inch, motivating flow from generator; 429 lb/hour; motivated flow from evaporator: 261 lb/hour. As condensor a finned tube condensor of 17 inch width, 16 inch height and 1.2 inch thickness is used. The condensing load was 690 lb/hour, 44800 BTU/hour. The condensing temperature was 110°F and the pressure 53 psi, at an external ambient air temperature of 92°F. The dimensions of the pump, including the motor, were: diameter 4 inch, length 10 inch; gear type, capacity 429 lb/hour, pumping head 347 psi, driven by an electrical motor of 180 Watt (15A at 12 V). The evaporator was of the finned tube conventional type, including a forced air fan. The evaporator load was 12000 BTU/hour at 60°F evaporation temperature and 77°F cabin air temperature. The power consumption of the fan was 84 W ( 7 A at 12 V ).

Further variations and applications of the illustrated embodiments will be apparent.

The following is a description of the main elements of the new unit, i.e., the ejector and the generator, which are quite different from conventional types of such equipment:

FIG. 3 illustrates the details of the ejector. The high pressure refrigerant vapour flows into the ejector designated as a whole by 62 through the inlet 2, then expands through the De Laval nozzle 4. The expansion through this nozzle creates relatively low pressure in the vicinity of the outlet from the nozzle, thus making possible the entrainment of refrigerant vapour from the evaporator through the inlet 6 into the ejector. An acceleration zone 8, which terminates in an annular orifice 10, causes the entrained or actuated refrigerant vapour from the evaporator to increase its velocity.

Increasing the velocity of the actuated vapour, thus decreasing the relative velocity between the actuating and actuated vapours, increases the mixing efficiency of these two streams. The general mechanical ejector efficiency is therefore high than that of one without the said device. The mixed vapours leaving the mixing zone 12 flow through the diffuses 14, then to the outlet 16 of the ejector.

The said structure of the ejector, which accelerates the entrained (actuated) vapor flow, makes it possible to reach relatively high entrainment ratios, ratio between the actuated and actuating motivating streams and this is the most important feature of the ejector in the air conditioning unit.

In FIG. 4 are shown the details of the high pressure refrigerant vapour generator. The refrigerant liquid pumped into the generator 54 through the inlet 20 flows into the row of upper tubes. The generator is of the shell 22 and tubes 24 type, but its inlet and outlet boxes 26, 28 are different from the conventional arrangement. The tube sheets are indicated by 30. The multi tube passes are maintained by using discs 32 and circular plates 34 with the pattern needed for the selected tube pass. In this present case a three tube pass is described. This will prevent stagnation zones in the evaporating refrigerant liquid.

The sealing of the inlet 26 and outlet boxes 28 is simple when using the said discs and plates device.

The refrigerant vapour leaving the generator through outlet 36 flows into a droplets separator which is described in connection with FIG. 1.

The exhaust gases flow through duct 52 into the shell side 22 of the generator, when a butterfly valve 38 is opened accordingly, otherwise the gases will by pass the generator directly to the muffler of the exhaust system.

What is claimed is:

1. In an air conditioner for cooling a motor vehicle passenger compartment, said vehicle having an engine with means emitting hot exhaust gases therefrom, a closed refrigerant fluid system containing a refrigerant fluid and utilizing the heat of said exhaust gases for powering said air conditioner comprising condenser means for liquifying said refrigerant fluid, evaporator means for vaporizing said refrigerant fluid and for effecting cooling of air passed therethrough by heat transfer from said air to said fluid, means for passing cooling air through said evaporator means and to said passenger compartment, generator means receiving said fluid in liquified form for effecting heat transfer from said engine exhaust gases to said liquified fluid to effect evaporation thereof, means for passing said exhaust gases through said generator means, ejector means located within said closed refrigerant system receiving evaporated fluid from said generator means and passing said fluid to said condensor means, recirculation means for passing liquified fluid from said condensor means partially to said evaporator means and partially to said generator means, and means for introducing evaporated fluid from said evaporator means into said ejector means to effect entrainment of said introduced fluid into the evaporated fluid passed by said ejector means from said generator means to said condensor means, said ejector means comprising means defining a low pressure side thereof at which said evaporated fluid from said evaporator means is introduced into said ejector means, and means defining an acceleration zone in which the velocity of entrained fluid is accelerated.

2. A system according to claim 1 wherein said generator means comprise a generator of the shell and tube type, said generator including inlet and outlet boxes, and sealing means comprising discs and circular plates arranged to seal the inlet and outlet boxes of the refrigerant tube side.

* * * * *